United States Patent [19]

Bluck et al.

[11] Patent Number: 4,923,751
[45] Date of Patent: May 8, 1990

[54] SEAMLESS METAL-CLAD FIBER-REINFORCED ORGANIC MATRIX COMPOSITE STRUCTURES, AND PROCESS FOR THEIR MANUFACTURE

[75] Inventors: Raymond M. Bluck, San Jose, Calif.; Harold G. Bush, Yorktown, Va.; Robert R. Johnson, Saratoga, Calif.

[73] Assignee: The United States of America as represented by the Administrator of the National Aeronautics and Space Administration, Washington, D.C.

[21] Appl. No.: 921,572

[22] Filed: Oct. 21, 1986

[51] Int. Cl.$^5$ ................................................ F16L 9/14
[52] U.S. Cl. .................................. 428/35.9; 138/141; 138/149; 138/153; 428/367; 428/376; 428/379; 428/416
[58] Field of Search ............... 428/36, 35.9, 367, 376, 428/379, 416; 138/141, 145, 149, 153; 156/276, 293, 294

[56] References Cited

U.S. PATENT DOCUMENTS

| | | | |
|---|---|---|---|
| 3,235,429 | 2/1966 | Boggs | 156/166 |
| 3,713,946 | 1/1973 | Molyneux | 156/293 |
| 3,886,015 | 5/1975 | Turner | 156/166 |
| 4,009,063 | 2/1977 | Wood | 156/71 |
| 4,047,731 | 9/1977 | Van Auken | 428/36 |
| 4,137,949 | 2/1979 | Linko, III et al. | 138/125 |
| 4,367,105 | 1/1983 | Rosier et al. | 156/79 |
| 4,384,905 | 5/1983 | Gros | 156/79 |
| 4,435,455 | 3/1984 | Prewo et al. | 428/36 |
| 4,436,118 | 3/1984 | Garrett | 138/153 |

FOREIGN PATENT DOCUMENTS 2507571 9/1975 Fed. Rep. of Germany ...... 156/276
849121 9/1960 United Kingdom.

Primary Examiner—James Seidleck
Attorney, Agent, or Firm—George F. Helfrich; John R. Manning; Charles E. B. Glenn

[57] ABSTRACT

A metallic outer sleeve 10 is provided which is capable of enveloping a hollow metallic inner member 12 having continuous reinforcing fibers 14 attached to the distal end thereof. Inner member 12 is then introduced into outer sleeve 10 until inner member 12 is completely enveloped by outer sleeve 10. A liquid matrix member 20 is then injected into space 22 between inner member 12 and outer sleeve 10. A pressurized heat transfer medium 23 is flowed through the inside of inner member 12, thereby forming a fiber reinforced matrix composite material 26. The wall thicknesses of both inner member 12 and outer sleeve 10 are then reduced to the appropriate size by chemical etching, to adjust the thermal expansion coefficient of the metal-clad composite structure 28 to the desired value.

3 Claims, 3 Drawing Sheets

SEAMLESS METAL-CLAD FIBER-REINFORCED ORGANIC MATRIX COMPOSITE STRUCTURES, AND PROCESS FOR THEIR MANUFACTURE

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435, 42 U.S.C. 2457).

BACKGROUND OF THE INVENTION

This invention relates to composite material articles and processes for their manufacture, and more particularly to seamless metal-clad filament-reinforced resin matrix composite tubular structures and processes for their manufacture.

Composite materials have great potential for solving challenging and often critical problems in the design of spacecraft and space structures. Mission objectives often impose severe requirements for dimensional stability over a wide range of temperatures, minimum weight, low cost, high stiffness and strength, thermal and electric conductivity and, more recently, the capability to withstand laser and nuclear threats. Probably the greatest constraint upon long orbital life for spacecraft is the susceptibility to attack by atomic oxygen in low earth orbit.

Composite materials offer specific strength, specific rigidity and thermal expansion characteristics that are superior to metallic materials; however, possessing strength and other properties in one primary direction, they lack transverse properties including torsion. Furthermore, conventional graphite-epoxy orientation mix constructions suffer from deleterious hygroscopic effects, such as moisture absorption and desorption, which effect dimensional change. A related serious problem is outgassing of condensable organic constituents, which will condense and deposit on critical surfaces in a space environment. In addition, a process must be provided for shielding ultraviolet radiation to protect the organic matrix from deleterious exposure, and for providing electrical conductivity to preclude static charging in space.

Metal-clad composites make a significant advancement over those composite systems being used for both spacecraft and aircraft; however, the material consolidation and tooling advances necessary to realize the potential of such metal-clad composites have not hitherto been achieved. Prior methods have involved tape-wrapping a metal foil, or spraying or depositing a thin metallic film on the fiber reinforced composite structure surfaces. Such methods suffer from lack of adhesion between the metal surface and the composite, porosity of surface, and high cost; and these methods have resulted in a product which is difficult to join to other structures and is non-tunable to precise thermal dimensional stability after manufacturing.

Accordingly, it is an object of this invention to provide an efficient method of producing seamless metal-clad composite structures.

A further object of this invention is to improve circumferential heat transfer in seamless metal-clad composite structures to reduce thermal stress to acceptable levels for the space environment, and to reduce thermal distortion of the structures due to circumferential temperature gradients.

A further object of this invention is to shield the organic matrix of a metal-clad composite structure from deleterious exposure due to ultra-violet radiation and to provide electrical conductivity to preclude static charging.

A further object of this invention is to provide a method of sealing and isolating the organic matrix of a metal-clad composite structure to preclude vaporization of condensable solids which will coat optical sensor and optical reflective surfaces.

A further object of this invention is to provide a method of toughening composite laminates of a metal-clad composite structure against mechanical impact damage.

A further object of this invention is to provide a method of hardening exposed surfaces of a metal-clad composite structure against directional radiant heating, such as laser, by providing transverse circumferential heat transport.

A further object of this invention is to provide a highly conductive surface of a metal-clad composite structure to dissipate or inhibit electron emission through a boundary.

A further object of this invention is to provide protection to the organic matrix of a metal-clad composite structure against deleterious attack by atomic oxygen.

Other objects and advantages of this invention will become apparent hereinafter in the specification and drawings which follow.

SUMMARY OF THE INVENTION

According to the present invention, the foregoing and additional objects are attained by providing a metallic outer sleeve which is capable of enveloping a hollow metallic inner member having continuous reinforcing fibers attached to the distal end thereof. These fibers may be collimated or pre-wrapped at any of various angles to attain the desired physical properties. This inner member is then introduced into the outer sleeve, distal end first, until the inner member is completely enveloped by the outer sleeve. An organic matrix material, such as epoxy resin, or a non-organic material, such as liquid glass, is then injected into the space containing the fibers between the inner member and the outer sleeve. A pressurized heat transfer medium is flowed through the inside of the inner member to cure the matrix and to structurally support the inner member to prevent buckling due to matrix injection pressure. Finally, both wall thicknesses are reduced to the appropriate size by chemical etching, to adjust the thermal expansion coefficient of the metal-clad composite to the desired value. Very beneficial results have been obtained by using aluminum tubes to encase a graphite-epoxy resin composite.

DETAILED DESCRIPTION OF THE INVENTION

Figure 1:
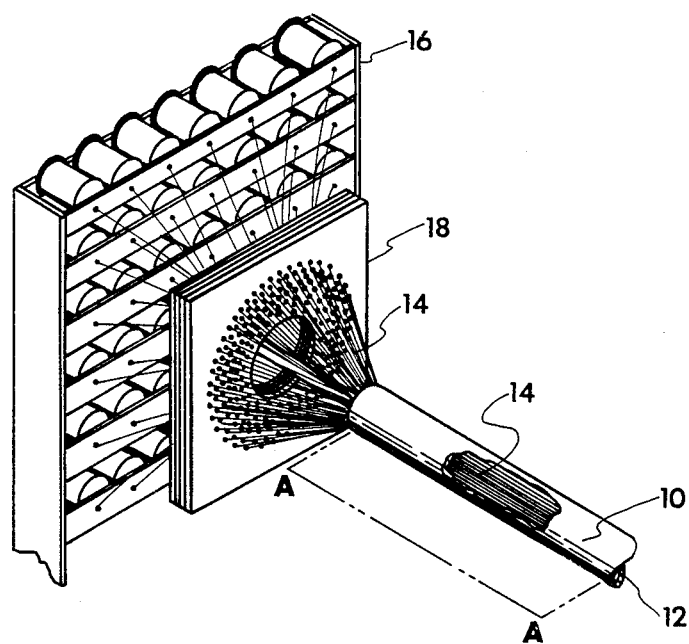
FIG. 1 is a pictorial view showing the insertion of an inner member with attached pre-aligned collimated reinforcing fibers into a surrounding outer sleeve in a process according to the present invention.
Figure 2:
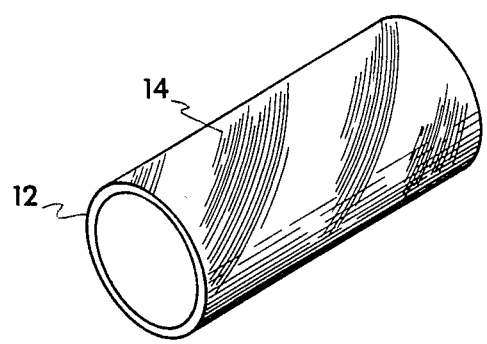
FIG. 2 is a pictorial view of an inner member showing the continuous reinforcing fibers aligned in a helical configuration.

As illustrated in FIG. 1 the present invention comprehends using a seamless metallic outer sleeve 10, shown here in its preferred tubular embodiment, with inside dimensions larger than the outside dimensions of a seamless metallic inner member 12. Continuous reinforcing fibers 14, pre-aligned by means such as fiber creel 16 and convergence plate 18, are attached at the distal end of the inner member 12 which is then introduced into one end of the outer sleeve 10 and moved, distal end first, into the outer sleeve 10 outer sleeve 10. Beneficial results have been obtained using an aluminum or magnesium clad graphite fiber composite. As shown in FIG. 2, continuous reinforcing fibers 14 may be aligned on inner member 12 in other than a collimated configuration, such as the helical arrangement depicted.

Figure 3:
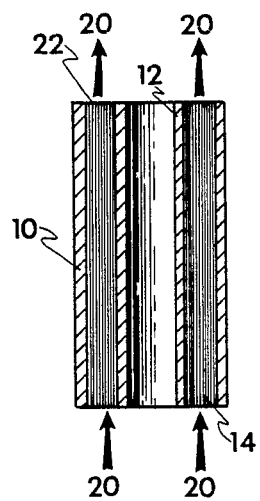
FIG. 3 is a cross-section along line A—A of FIG. 1 showing the injection of liquid matrix material into the space between the two members.

Referring now to FIG. 3, the distal end of the inner space 22 containing the fibers 14 is then sealed and evacuated. Liquid matrix material 20, such as epoxy resin or liquid glass, is injected into the space 22 between the inner member 12 and the outer sleeve 10.

Figure 4:
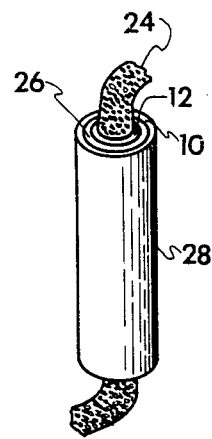
FIG. 4 is a pictorial view of the composite structure produced by the process of FIGS. 1, 2 and 3, showing a curing technique for the liquid matrix material.

The liquid matrix material 20 is then cured, as illustrated in FIG. 4, by flowing a pressurized heat transfer medium 24, such as hot water or steam in the case of an epoxy matrix, or cold water if liquid glass is being injected, through the inner member 12, forming thereby a fiber reinforced matrix composite material 26.

Figure 5:
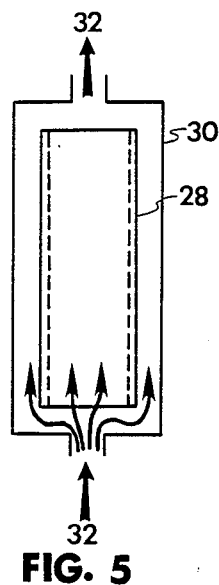
FIG. 5 is an exposed side view showing an etching method for reducing the wall thicknesses of the outer sleeve and inner member.

As shown in FIG. 5, the metal-clad composite structure, denoted generally by 28, is then immersed in a chemical etching chamber 30, wherein the wall thicknesses of both the inner member 12 and the outer sleeve 10 are reduced by processing with a suitable chemical reagent 32, such as sodium hydroxide, to the appropriate dimension to adjust the thermal expansion coefficient thereof to the desired value.

Figure 6:
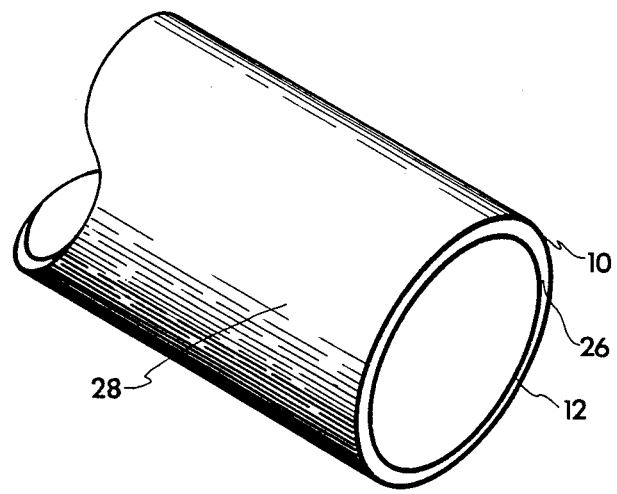
FIG. 6 is a pictorial view of a representative completed metal-clad composite structure according to the present invention.

The completed seamless metal-clad fiber reinforced organic matrix composite structure 28 is shown in FIG. 6 in its preferred embodiment.

It should become obvious to those skilled in the art that this invention is not limited to the preferred embodiments shown and described. In addition to encompassing structures of varying shapes, it is understood that structures of diverse make up are contemplated by the present invention. Very advantageous results have been achieved using an aluminum clad graphite epoxy tube. However, structures of rectangular cross-section and "z-shaped" structures constructed of magnesium and epoxy have also proven very beneficial.

What is claimed is:

1. A seamless metal-clad composite structure having a controlled coefficient of thermal expansion for construction of space truss elements comprising:
    a hollow metallic inner member,
    a metallic outer sleeve surrounding the inner member so that an inner space is defined therebetween,
    said inner member and outer sleeve having a positive coefficient of thermal expansion,
    a plurality of continuous reinforcing fibers in a cured matrix material completely filling said inner space,
    said continuous reinforcing fibers having a negative coefficient of thermal expansion,
    whereby the coefficient of thermal expansion of the composite structure may be tuned to a desired value by adjusting the thickness of the inner member and the outer sleeve.

2. An article as in claim 1 wherein said metal-clad composite structure comprises:
    a hollow aluminum inner tube,
    an aluminum outer sleeve disposed concentrically around said inner tube so that an annular inner space is defined therebetween, and
    a plurality of continuous graphite reinforcing fibers in a cured epoxy matrix completely filling said inner space,
    whereby the coefficient of thermal expansion of the composite structure may be tuned to a desired value by adjusting the thicknesses of the inner tube and the outer sleeve.

3. An article as in claim 1 wherein said inner space is filled with continuous graphite reinforcing fibers in a hardened glass mixture.

* * * * *